March 4, 1941.  H. V. SMITH  2,233,433
GLASS WOOL
Filed Aug. 6, 1936
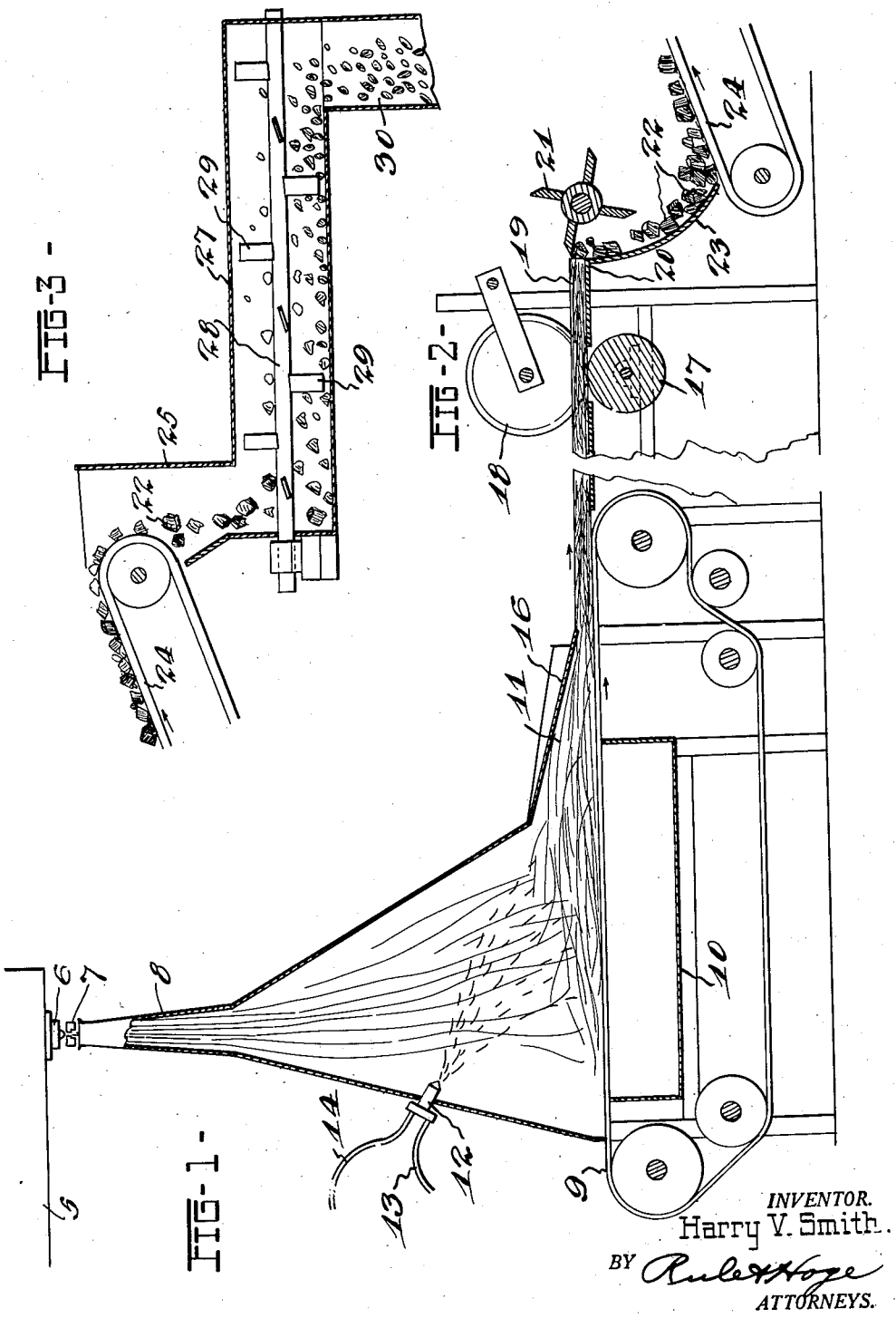
INVENTOR.
Harry V. Smith.
BY *Rule & Hoge*
ATTORNEYS.

Patented Mar. 4, 1941

2,233,433

UNITED STATES PATENT OFFICE 2,233,433

GLASS WOOL

Harry Vroman Smith, Newark, Ohio, assignor, by mesne assignments, to Owens-Corning Fiberglas Corporation, Toledo, Ohio, a corporation of Delaware Application August 6, 1936, Serial No. 94,619

11 Claims. (Cl. 154—28)

The present invention relates to glass wool and more particularly to a coating for the individual fibers, which produces novel results, particularly when forming nodulated wool.

Heretofore, in the formation of nodulated glass wool, it has been customary to reduce matted glass wool into individual chunks which are rolled into nodules. The fibers of which the glass wool is comprised, are ordinarily formed by rapidly drawing or attenuating small streams of molten glass to the form of very fine fibers which are instantaneously cooled and solidified. During or immediately after the formative state of the fibers, various coatings have been applied for various purposes, such as lubrication, increase in acidity and fireproofing the fibers. Such coating materials are commonly called tempering oils and and include emulsions of mineral oil and stearic acid, and other ingredients in water. The glass fibers comprising the matted glass wool were generally long, fine fibers having indefinite, indeterminable lengths, theoretically endless, and generally too long to follow through the matted maze of fibers. The thickness of these fibers was generally of the order of magnitude of about .0005 inch to .005 inch in diameter, although, of course, these limits are merely those of commercial practice and are not intended as limiting the invention.

The mats of glass wool composed of these glass fibers have extremely low densities of about 1 pound to 4 pounds per cubic foot and can be readily made to have a density of about 1½ pounds per cubic foot, which is preferable.

When glass wool having the above characteristics was reduced to chunks and then rolled into nodules, the density of the nodules invariably rose to several times its original density and it was difficult to produce nodulated wool having a density less than about 3 to 3½ pounds per cubic foot, or even higher. Moreover, other difficulties were experienced in reducing the matted glass wool into chunks. This step generally included slitting and chopping of the bats which reduced the glass wool into cubes, but these steps were accompanied with the problem of producing sharp, clean-cut edges for the cubes. Frequently portions of the fibers could not be completely cut and loose ends hung out over the edge of the cubes and tended to pull them out of shape. The loose ends projecting out from the cubes also caused groups of the cubes to hang together and make the nodulating operation difficult.

The prior art has the foregoing, as well as other shortcomings and disadvantages, which it is an object of the present invention to overcome.

It is also an object of the present invention to produce nodulated glass wool having an extremely low density ranging about 1½ to 2½, and preferably about 2 pounds per cubic foot.

It is another object of the present invention to provide glass wool which may be readily and easily cut into sharp, clean-cut cubes having no overhanging loose fibers which would render the individual nodules fuzzy and mutually adhering.

Another object of the present invention is to condition the surface of the fibers by means of regulating the degree of free alkali on the surface to the end that the nodules are stiffer and more flexible, and may be rolled into nodules with greater facility.

Other objects and advantages of the present invention will become apparent from the following description taken in conjunction with the drawing, in which:

Fig. 1 is an elevational view of means and apparatus for producing glass fibers and coating the fibers in accordance with the present invention;

Fig. 2 is a fragmentary diagrammatic view of a slitting and chopping mechanism for reducing the fibers into cubes; and Fig. 3 is a fragmentary cross-sectional view of a nodulating apparatus for rolling the cubes into nodules.

Referring more particularly to Fig. 1, reference character 5 designates a conventional glass furnace which may be of any particular type, such as electric, ceramic furnace or the like. Mounted beneath the furnace 5 is a bushing 6 adapted to emit fine, molten streams of glass which are attenuated and drawn into fine fibers by steam blasts issuing from a blower 7, which is spaced below the bushing 6. The fibers are carried by the steam blast from the blower at high velocity into a hood 8, which has been shown to be expanding in cross-section to permit the steam to expand and decelerate in velocity. At the base of the hood 8 is a reticulated belt 9 upon which the fibers are arrested as the vehicular blast passes through the belt and is carried away through the suction box or exhaust duct 10. As the fibers are deposited upon the belt 9, they are built up into a light, fluffy mat 11 of glass wool.

Mounted at the back of the hood 8 is a spray gun 12 having conduits 13 and 14 for compressed air or steam and tempering oil, respectively. The compressed air or steam serves to blast the tempering oil into a spray which is directed upon the moving fibers and the mat 11 during the latter's formative period. The tempering oil is permitted to coat the individual fibers uniformly throughout the mat.

The mat 11 is conveyed by the belt 9 out through the discharge end of the hood 8 where the mat is momentarily compressed by an overlying apron 16, which serves to close up this end of the hood and prevent the influx of atmospheric air.

Referring now to Fig. 2, which illustrates diagrammatically a slitter and chopper for reducing the mat to chunks or cubes, reference character 17 designates a roller which coacts with a series of parallel slitter discs 18, between which the mat 11 is conveyed and cut into longitudinal strips 19. The strips are then passed over a base plate 20, coacting with rotating knife blades 21, which shear off the strips and reduce them to chunks or cubes 22. Spaced below the revolving knife blades 21 is a chute 23 and a conveyor belt 24, which carries the chunks to the nodulator, shown in Fig. 3.

The nodulator shown diagrammatically in Fig. 3 comprises a hopper 25 into which the cubes 22 are conveyed by means of the belt 24. The hopper admits the cubes into a trough 27 having mounted therein a rotating shaft 28 and a plurality of beater blades 29 which are set at a predetermined pitch to the shaft 28, the pitch being regulated in accordance with the degree of nodulation desired. The chunks are rolled into nodules within the trough 27 and are gradually advanced to the discharge end 30, where they are available for storage, packing or the like.

In accordance with my invention, I propose to increase the free alkalinity of the surface of the fibers. Whereas ordinary glass fibers, when first produced, have been found to have a slight amount of free alkali ranging in the neighborhood of .035%, more or less, of course, in accordance with the type of glass and the degree of attenuation of the fibers, I propose to increase the alkalinity to about .045 to .15%. The increase in alkalinity may be accomplished in several ways. I have found it possible to incorporate a small percentage of sodium hydroxide into a tempering oil. A small amount of this ingredient in the tempering oil may raise the free alkali on the surface of the fibers to about .15%, which gives excellent results for the slitting, chopping and nodulating operations.

I have found, however, and propose as the preferable manner of increasing the free alkalinity, to add a small amount of sodium silicate to the tempering oil. This substance may be added in small amounts, such as, for example, less than about ½ of 1%. When producing granulated wool which is particularly adapted for blowing through a hose, sodium silicate is preferably added in amounts from .28% to .34%; and, when producing nodulated wool, particularly adapted for pouring into place, sodium silicate is preferably added from about .14% to .24%. When sodium silicate is added in suitably small proportions, excellent slitting, chopping, granulating and nodulating results may be obtained without materially causing the fibers to dust or become weakened.

The amount of oil which is to be added, together with the sodium silicate, has also been found to be important for I have found that a tempering oil comprising about one-fifth sodium silicate and the remainder oil and other ingredients is preferable. The proportions by weight of oil and sodium silicate to be added to the glass wool may be in accordance with the following table:

*Granulated wool for blowing*

| | Per cent |
|---|---|
| Oil | 1.4 to 1.8 |
| Sodium silicate | .28 to .34 |

*Nodulated wool for pouring*

| | |
|---|---|
| Oil | .7 to 1.2 |
| Sodium silicate | .14 to .24 |

The exact proportions of ingredients, however, may be varied to suit particular conditions, although I have found that the oil should be added in amounts sufficient to prevent material dusting or disintegration of the fibers. The sodium silicate, however, is added in amounts sufficient to increase the stiffness and flexibility of the fibrous mass without causing the individual fibers to be bonded together or be materially embrittled and weakened by the addition of sodium silicate. As an example of a suitable tempering oil, it is possible to mix up an 80 gallon batch, comprising 7½ lbs. stearic acid, 20 lbs. of mineral oil, 1¾ gallons of sodium silicate and the remainder water.

As another method of compounding tempering oil, it is possible to form a concentrate of 50% water and 50% oil, stearic acid and zinc stearate, the latter two ingredients being added in any particular desired amounts. Four hundred pounds of this concentrate may then be diluted with water to 450 gallons to which is added 15 gallons of sodium silicate. The final mixture is then sprayed onto the glass wool during its formation as above noted.

If too large a percentage of free alkali or sodium silicate is added to the surface of the fibers, an accelerated aging and undue dusting of the fibers is caused, particularly in the presence of moisture and water. This aging phenomena is caused by the etching of the glass to such a degree that the alkali within the glass is more readily leached to the surface, causing an accumulative etching and weakening of the fibers. The addition of sodium silicate, however, in the small amounts set out hereinabove, does not cause excessive aging or weakening of the fibers.

While I have shown a more or less specific embodiment of the method and apparatus for reducing the glass to glass fibers, and a method and apparatus for nodulating the matted glass fibers, these are merly exemplary of available means for accomplishing the desired results, and other suitable means may be used, as those skilled in the art would readily understand.

Modifications and variations may be resorted to which are within the scope and spirit of the present invention.

I claim:

1. Glass wool having a thin coating of free alkali over the individual fibers composing the glass wool in amounts less than about one-half of one percent by weight, said added alkali being present to a degree greater than the normal amount of free alkali caused by the leaching of alkali to the surface of the glass itself.

2. Glass wool having a thin coating of free alkali over the individual fibers composing the glass wool, said added alkali being present to a degree greater than the normal amount of free alkali caused by the leaching of alkali to the surface of the glass itself, and said amount of alkali being less than about five times the said normal amount of alkali.

3. A mat of glass wool fibers having distributed over the individual surfaces thereof small layers of alkali in amounts ranging from about .14% to .34% by weight, said added alkali being sufficient to cause said glass fibers to be etched, although insufficient to fill the interstices between the fibers of the mat.

4. A mat of glass wool fibers having distributed over the individual surfaces thereof thin layers of sodium silicate in amounts ranging from about .14% to .34% by weight, said layers being sufficient to cause said glass fibers to be etched, although insufficient to fill the interstices between the fibers.

5. The method of producing nodulated glass wool which comprises forming a mat of glass wool fibers, coating said fibers with a thin layer of free alkali in amounts not more than about one-half of one percent by weight, reducing said mat to individual chunks, and then rolling said chunks to nodules.

6. The method of producing nodulated glass wool having a density less than about 4 pounds per cubic foot, which includes the steps of coating the fibers of said glass wool with a thinly applied layer of sodium silicate in amounts not more than about one-half of one percent by weight, and nodulating said glass wool.

7. The method of conditioning a loose fluffy resilient mat of glass wool preparatory to cutting said mat, which includes the step of coating the fibers of said mat with a thinly applied layer of sodium silicate in amounts not more than about one-half of one percent by weight.

8. The method of conditioning a loose fluffy resilient mat of glass wool which comprises coating the fibers of said mat with a thinly applied layer of sodium silicate in amounts not more that about one-half of one percent by weight, and then cutting said mat into smaller mats.

9. The method of producing nodulated glass wool which comprises forming a mat of glass wool fibers, coating said fibers with a thin layer of free alkali in amounts ranging from about .14% to .34% by weight, reducing said mat to individual chunks, and then rolling said chunks into nodules.

10. The method of conditioning a loose fluffy resilient mat of glass wool preparatory to cutting said mat, which includes the step of coating the fibers of said mat with a thinly applied layer of sodium silicate in amounts ranging from about .14% to .34% by weight.

11. The method of conditioning a loose fluffy resilient mat of glass wool preparatory to cutting said mat, which includes the step of coating the fibers of said mat with a thinly applied layer of an alkali in amounts not more than about one-half of one percent by weight.

HARRY VROMAN SMITH.